United States Patent [19]
Gokey et al.

[11] 3,739,186
[45] June 12, 1973

[54] AC/DC SUPPLY CIRCUIT FOR AN APPLIANCE

[75] Inventors: Phillip E. Gokey, Whitewater; Frederick A. Rose, Ft. Atkinson, both of Wis.

[73] Assignee: Polar Ware Corporation, Sheboygan, Wis.

[22] Filed: Mar. 17, 1970

[21] Appl. No.: 20,367

[52] U.S. Cl. .................................. 307/23, 321/8
[51] Int. Cl. .................................. H02j, H02m
[58] Field of Search ............... 321/8, 45; 307/11, 307/23, 29, 66, 82; 315/209 CD

[56] References Cited
UNITED STATES PATENTS

| | | | |
|---|---|---|---|
| 3,473,040 | 10/1969 | Cominassi et al. | 307/11 |
| 2,920,260 | 1/1960 | Goffstein | 307/66 |
| 3,480,851 | 11/1969 | Hoge | 321/8 R |
| 3,339,080 | 8/1967 | Howald | 307/66 |
| 3,424,945 | 1/1969 | Seider et al. | 315/209 CD |

Primary Examiner—William H. Beha, Jr.
Attorney—Hill, Sherman, Meroni, Gross & Simpson

[57] ABSTRACT

Both alternating and direct potentials are provided from either an alternating or a direct supply to control a low voltage, direct current operated solenoid valve of a burner and a high, alternating voltage operated igniter for the burner. A burner electrical supply circuit for connection to either type of electrical supply employs a transformer commonly associated and selectively connectable with a converter and an inverter respectively for step-down and step-up operation.

5 Claims, 1 Drawing Figure

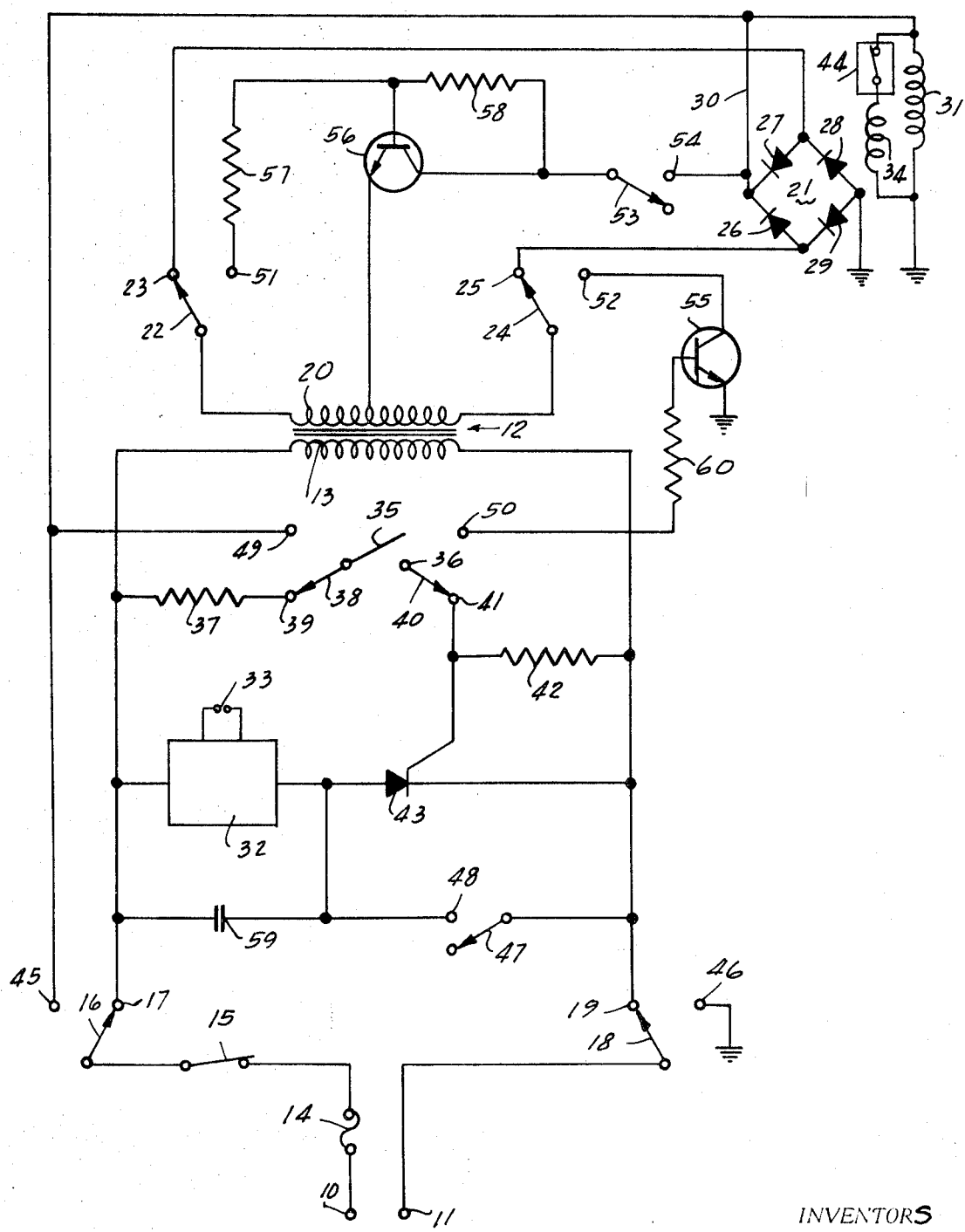
INVENTORS
PHILLIP E. GOKEY
FREDERICK A. ROSE 3,739,186

1

AC/DC SUPPLY CIRCUIT FOR AN APPLIANCE

BACKGROUND OF THE INVENTION

1. Field of the Invention

This invention relates to electrical supply systems and is particularly concerned with electrical supply circuits for providing both a-c and d-c potentials from either an a-c or a d-c source, and to techniques for igniting a burner from a low voltage direct supply.

2. Description of the Prior Art

Appliances which employ electrically ignited burners, such as heaters and incinerators, have heretofore been limited to use to locations having a high voltage alternating supply as is provided by a commercial power system or a local generating plant. Installation of such appliances therefore has not been extensive in out of the way locations, such as cottages and camp sites, or in transient type locations, such as mobile homes, trailers and campers.

Inasmuch as a conventional direct source, a battery is available to nearly all such locations, it is highly desirable but heretofore unknown, that such supplies be advantageously employed to energize burner-type appliances.

SUMMARY OF THE INVENTION

An electrical supply circuit according to the invention, employs a transformer which is selectively connectable in the circuits of both a converter and an inverter to provide both alternating and direct potentials to an appliance in response to provisions of either an a-c or a d-c supply at the input terminals of the circuit.

More specifically, a converter is provided including a transformer and a rectifier for providing a stepped-down direct voltage from an alternating source for controlling a solenoid valve of a burner. An igniter is connectable across the input terminals of the circuit to provide ignition from the alternating wave applied thereto. An oscillator inverter utilizing transistors selectively connectable in circuit with the same transformer in a step-up configuration as employed to produce the high voltage alternating wave for the igniter circuit when a low voltage direct source is applied to the circuit input terminals.

It is therefore an object of the invention to provide an electrical supply circuit for supplying both alternating and direct potentials from a source of either type of potential.

Another object of the invention is to provide flexibility and versitility in the utilization of burner-type appliances in transient and out of the way locations.

A further object of the invention is to provide an electrical supply circuit which is capable of igniting and operating a burner from either a-c or d-c sources.

BRIEF DESCRIPTION OF THE DRAWING

Other objects, features and advantages of the invention, along with its organization, construction and operation, will be best understood from the following detailed description of an exemplary embodiment thereof, taken in conjunction and with reference to the accompanying single drawing which carries thereon a schematic circuit diagram of an electrical supply system and a solenoid valve of a burner and a igniter for the burner.

DESCRIPTION OF THE PREFERRED EMBODIMENT

A burner-control circuit is exemplified in the drawing as comprising a pair of input terminals 10 and 11 for connection to a conventional electrical source, for example 125 volts AC at 60 Hz. Terminal 10 is connected to one terminal of a primary winding 13 of a step-down transformer 12 over a series path including a fuse 14, a supply switch 15 and a switch contact 16 engaged with a switch contact 17. The terminal 11 is connected to the other terminal of winding 13 over a series path including a switch contact which is engaged with a switch contact 19. The voltage is therefore stepped down at a secondary winding 20 of the transformer 12 whereupon it is impressed across a bridge rectifier 21 over a first path including a switch contact 22 in engagement with a switch contact 23, and over a second path including a switch contact 24 in engagement with a switch contact 25. The bridge rectifier 21 includes a plurality of diodes 26–29 which are connected for full-wave rectification of the alternating wave. A pair of diodes 28, 29 have their anodes commonly connected and in turn connected to ground while another pair of the diodes 26, 27 have their cathodes commonly connected, and in turn connected by way of a conductor 124 to a winding 32 of a load.

The load is a solenoid controlled gas valve having a fuel valve control winding 31 for operation on, for example, 12 vdc. The load also includes an igniter 32, having a spark gap 33, connected across the contacts 17 and 19 and the winding 13 of the transformer 12 for operation in response to alternating current, for example 125 vac.

Upon application of direct current to the winding 31, a relay preferably reed relay, including a winding 34 is energized to close its contacts 35, 36 associated with the igniter circuit 32. Closure of the contacts 35, 36 effects a voltage divider including a resistor 37, a contact 39 engaged by a contact 38, the contacts 35 and 36, a contact 40 in engagement with a contact 41 and a resistor 42 connected together across the commercial supply. One terminal of the resistor 42 is connected to the gate electrode of a controlled rectifier 43 for energization of the igniter 32 to provide ignition at the gap 33.

The load includes a flame proven switch 44 having a flame sensor (not shown). The switch 44 opens upon the detection of an adequate flame to deenergize the relay winding 34 and open the contacts 35, 36 thereof and deenergize the igniter 32.

Although the circuit has been described for operation from a commercial alternating supply, the circuit is also operable from a conventional direct supply as a 12 volt battery connected to the input terminals 10, 11. For operation on direct current, the circuit is provided with a switch or changeable terminal strip represented by the aforementioned contacts 16–19 and 22–25, and other contacts 45–54. These connections are illustrated as they would be arranged for AC operation; for DC operation their opposite arrangement is effected.

In DC operation a suitable supply is connected to the input terminals 10 and 11. The terminal 11 is connected to a reference, here ground, by way of closed contacts 18 and 46. The terminal 10, however, is connected to the winding 32 of the load 31 by way of the fuse 14, switch 15, and contacts 16 and 45. The direct current potential necessary for operation of the winding 31 and the winding 34 is therefore made available directly from the external supply. The ignition circuit 32 is, however, modified for DC operation. In order to provide the necessary high voltage for reliable ignition at the gap 33, means are provided for generating the required voltage. To this end, an oscillator inverter is provided comprising a transistor 55, a transistor 56, the transformer 12, a resistor 57, a resistor 58, and a capacitor 59.

Upon the demand for ignition and the corresponding closure of the relay contacts 35, 36 the base of the transistor 55 is connected by way of a resistor 60 and switch contacts 50, 40, 36, 35, 38, 49, 45 and 16, and switch 15 and fuse 14 to the input terminal 10. The transistor 55 is therefore rendered conductive and establishes a path to ground for the emitter of the transistor 56 by way of the winding 20 and the contacts 52 and 24. Also, the direct current potential is further applied to the collector of the transistor 56 by way of the conductor 30, and the contacts 45 and 16. The same potential is applied to the base of the transistor 56 by way of the resistor 58 and the emitter of the transistor 56 is further connected to the base of the transistor by way of the winding 20, the switch contacts 22 and 51 and the resistors 57. The transistor 56 is therefore rendered operative in an oscillatory mode wherein the previously designated secondary winding 20 is now effective as a primary winding and the previously designated primary winding 13 is effective as a secondary winding, the switch contacts 46 and 48 being effective to place the capacitor 59 across the winding 13 and across the igniter 32. The upper portion of the winding 20 and the resistor 57 provide a positive feedback for the transistor 56 to sustain oscillations. Attention is especially invited to the fact that the transformer 12 is being employed in this instance as a step-up transformer; whereas, in AC operation it was employed as a step-down transformer. The application of the required high level alternating voltage across the igniter 32 energizes the igniter to provide the necessary spark at the gap 33. At this point the burner ignites and the flame sensor operates to open the switch 44 and deenergize the winding 34. Deenergization of the winding 34 opens the contact 35, 36 to remove the enabling bias for the transistor 55 and turn off the oscillator.

Of course, many changes and modifications of the invention may be become apparent to those skilled in the art without departing from the true spirit and scope of the invention, and it is to be understood that we wish to include within the patent warranted hereon all such changes and modifications as may be reasonably and properly included within the scope of our invention.

What we claim is:

1. An electrical supply circuit for supplying a load which requires both alternating and direct current inputs for operation, comprising:
    a single pair of input terminals for connection to an electrical supply;
    first and second output terminals for supplying alternating and direct current outputs to a load;
    a converter for supplying a dc output;
    an inverter for supplying an ac output;
    a transformer associated with both said converter and said inverter; and
    means for selectively connecting said transformer and said input and output terminals in circuit with said converter and said inverter in accordance with the alternating or direct current characteristic of the electrical supply.

2. A circuit for providing direct and alternating potentials from either an alternating current supply or a direct current supply, comprising: a transformer having a first winding and a second winding; rectifier means; transistor means; a single pair of input terminals for connection to an electrical supply; and connection means for configuring said circuit in two circuit arrangements, a first circuit arrangement to establish connections between said input terminals and said first winding and between said second winding and said rectifier means whereby said rectifier means provides a low voltage direct current output to a load, and a second circuit arrangement to establish connections between said input terminals and said transistor means and between said transistor means and said second winding to provide an oscillator whereby said first winding provides an alternating current output to a load.

3. The circuit according to claim 2, wherein said second winding includes a tap and said transistor means includes a transistor having a first electrode connected to said tap, and a second transistor having a second electrode connected in circuit with said first electrode via said second winding and the tap thereof, a third electrode connected to ground, and a fourth electrode connectable to one of said input terminals via said connection means.

4. The circuit according to claim 2, wherein said first winding has a greater number of turns that said second winding to provide step-down transformer action for said first circuit arrangement and step-up transformer action for said second circuit arrangement.

5. The circuit according to claim 2, comprising capacitive means connected across said first winding.

* * * * *